(12) United States Patent
Seo et al.

(10) Patent No.: US 7,321,725 B2
(45) Date of Patent: Jan. 22, 2008

(54) LIGHT-AMOUNT CONTROL DEVICE FOR PHOTOGRAPHING

(75) Inventors: Shuzo Seo, Saitama (JP); Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 135 days.

(21) Appl. No.: 10/980,284

(22) Filed: Nov. 4, 2004

(65) Prior Publication Data

US 2005/0100334 A1    May 12, 2005

(30) Foreign Application Priority Data

Nov. 12, 2003    (JP)    ............................ P2003-382299

(51) Int. Cl.
*G03B 15/05* (2006.01)
*H04N 5/222* (2006.01)

(52) U.S. Cl. .................. 396/61; 396/164; 348/371

(58) Field of Classification Search .................. 396/61, 396/164, 182; 348/175, 176, 187, 188, 370, 348/371; 362/5
See application file for complete search history.

(56) References Cited

U.S. PATENT DOCUMENTS

| | | | |
|---|---|---|---|
| 5,713,053 A | 1/1998 | Hirai | ............................ 396/92 |
| 6,400,455 B1 * | 6/2002 | Kurokawa et al. | ........ 356/239.1 |
| 2006/0110145 A1 | 5/2006 | Fujimoto et al. | ............. 396/14 |

FOREIGN PATENT DOCUMENTS

| | | |
|---|---|---|
| JP | 2003-114463 | 4/2003 |
| JP | 2002-148686 | 5/2003 |
| WO | WO 2004088588 A1 * | 10/2004 |

OTHER PUBLICATIONS

English Language Abstract of JP2003-114463, published Apr. 18, 2003.
U.S. Appl. No. 10/956,076 to Shuzo Seo, filed on Oct. 4, 2004.

* cited by examiner

*Primary Examiner*—W. B. Perkey
*Assistant Examiner*—Rishi S. Suthar
(74) *Attorney, Agent, or Firm*—Greenblum & Bernstein, P.L.C.

(57) ABSTRACT

A light-amount control device includes a plurality of lighting units each of which emits light for illuminating a photographing area of a photographing optical system. Further, the light-amount control device includes a peripheral light amount data calculator and a lighting unit controller. The peripheral light amount data calculator calculates a peripheral light amount data defining ratios of light emission intensities for the lighting units, to make the illuminance of an image plane of a standard object that has a flat surface being perpendicular to the optical axis of the photographing optical system and having a constant reflecting light ratio, constant when the standard object is illuminated by the lighting units. The image plane is formed by reflected light from the surface of the standard object that enters the photographing optical system. The lighting unit controller controls the lighting units so that the intensity of light at a wider illuminating angle to an optical axis of the photographing optical system becomes higher, based on the peripheral light amount data.

6 Claims, 6 Drawing Sheets

LIGHT-AMOUNT CONTROL DEVICE FOR PHOTOGRAPHING

BACKGROUND OF THE INVENTION

1. Field of the Invention

The present invention relates to a light-amount control device for controlling the amount of light emitted towards subjects to be photographed by silver-halide film cameras, digital cameras, cellular phones, and other devices with photographing functions.

2. Description of the Related Art

Recently, a smaller amount of light than before is required for illuminating objects, with a lighting apparatus, because of improvements in sensitivity of silver-halide films, color films, and CCDs. Therefore, even though the amount of light output by LEDs is smaller than that output by conventional xenon tubes, usage of LEDs as a lighting apparatus for photographing is proposed for improved lighting efficiency, reduced power consumption, and increased life.

However, because a single LED can not emit enough light for photographing, an apparatus including a plurality of LEDs as light sources, is proposed.

In the case where light is emitted for photographing, it is ideal that the entire photographing area of the camera is uniformly illuminated. However, because of a characteristic of the photographing lens known as the cosine fourth law, the luminance at the periphery of the photographing area becomes dark when the entire photographing area is uniformly illuminated.

SUMMARY OF THE INVENTION

Therefore, an object of the present invention is to provide a light-amount control device using a plurality of light sources, and control the amount of light emitted by the light sources so that objects in the entire photographing area are photographed under constant luminance, by making up for the fall-off of the reflected light amount entering the periphery of the photographing lens.

A light-amount control device includes a plurality of lighting units each of which emits light for illuminating a photographing area of a photographing optical system, a peripheral light amount data calculator, and a lighting unit controller. The peripheral light amount data calculator calculates peripheral light amount data defining ratios of light emission intensities for the lighting units, to make the illuminance of an image plane of a standard object that has a flat surface being perpendicular to the optical axis of the photographing optical system and having a constant reflecting light ratio, constant when the standard object is illuminated by the lighting units. Here, the image plane is formed by reflected light from the surface of the standard object that enters the photographing optical system. The lighting unit controller controls the lighting units so that the intensity of light at a wider illuminating angle to an optical axis of the photographing optical system becomes higher, based on the peripheral light amount data.

The photographing optical system may be a zooming optical system, and the peripheral light amount data may be calculated based on a focal length of the photographing optical system. Further, the peripheral light amount data can be calculated based on the predetermined focal length and the illuminating angle.

A lens barrel, according to the present invention, includes a photographing optical system and a peripheral light amount data memory that memorizes peripheral light amount data. Further the lens barrel is detachably attached to a light-amount control device body having a plurality of lighting units and a lighting unit controller. Each of the lighting units emits light for illuminating a photographing area of the photographing optical system. The lighting unit controller controls the lighting units so that the intensity of light at a wider illuminating angle to an optical axis of the photographing optical system becomes higher, based on the peripheral light amount data. The peripheral light amount data defines ratios of light emission intensities for the lighting units, to make the illuminance of an image plane of a standard object that has a flat surface being perpendicular to the optical axis of the photographing optical system and having a constant reflecting light ratio, constant when the standard object is illuminated by the lighting units. The image plane is formed by reflected light from the surface of the standard object and entering the photographing optical system.

The photographing optical system of the lens barrel may be a zooming optical system and the peripheral light amount data may be based on a focal length of the photographing optical system. Further, the peripheral light amount data can be based on the predetermined focal length and the illuminating angle.

A camera system according to the present invention, includes a lens barrel and a light-amount control device body to which the lens barrel is detachably attached. The lens barrel includes a photographing optical system and a peripheral light amount data memory that memorizes peripheral light amount data. The light-amount control device body includes a plurality of lighting units and a lighting unit controller. Each of the plurality of lighting units emits light for illuminating a photographing area of the photographing optical system. The lighting unit controller controls the lighting units so that the intensity of light at a wider illuminating angle to an optical axis of the photographing optical system becomes higher, based on the peripheral light amount data. The peripheral light amount data defines ratios of light emission intensities for the lighting units, to make the illuminance of an image plane of a standard object that has a flat surface being perpendicular to the optical axis of the photographing optical system and having a constant reflecting light ratio, constant when the standard object is illuminated by the lighting units, the image plane being formed by reflected light from the surface of the standard object and entering the photographing optical system.

The lens barrel may further include a peripheral light amount data transmitter that transmits the peripheral light amount data to the light-amount control device body. The light-amount control device body may further include a peripheral light amount data calculator that calculates the peripheral light amount data. The peripheral light amount data calculator may calculate new peripheral light amount data differing from the original peripheral light amount data memorized in the peripheral light amount data memory and transmitted by the peripheral light amount data transmitter, based on the original peripheral light amount data.

The photographing optical system of the camera system may be a zooming optical system and the peripheral light amount data may be based on a focal length of the photographing optical system. Further, the peripheral light amount data can be based on the predetermined focal length and the illuminating angle.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
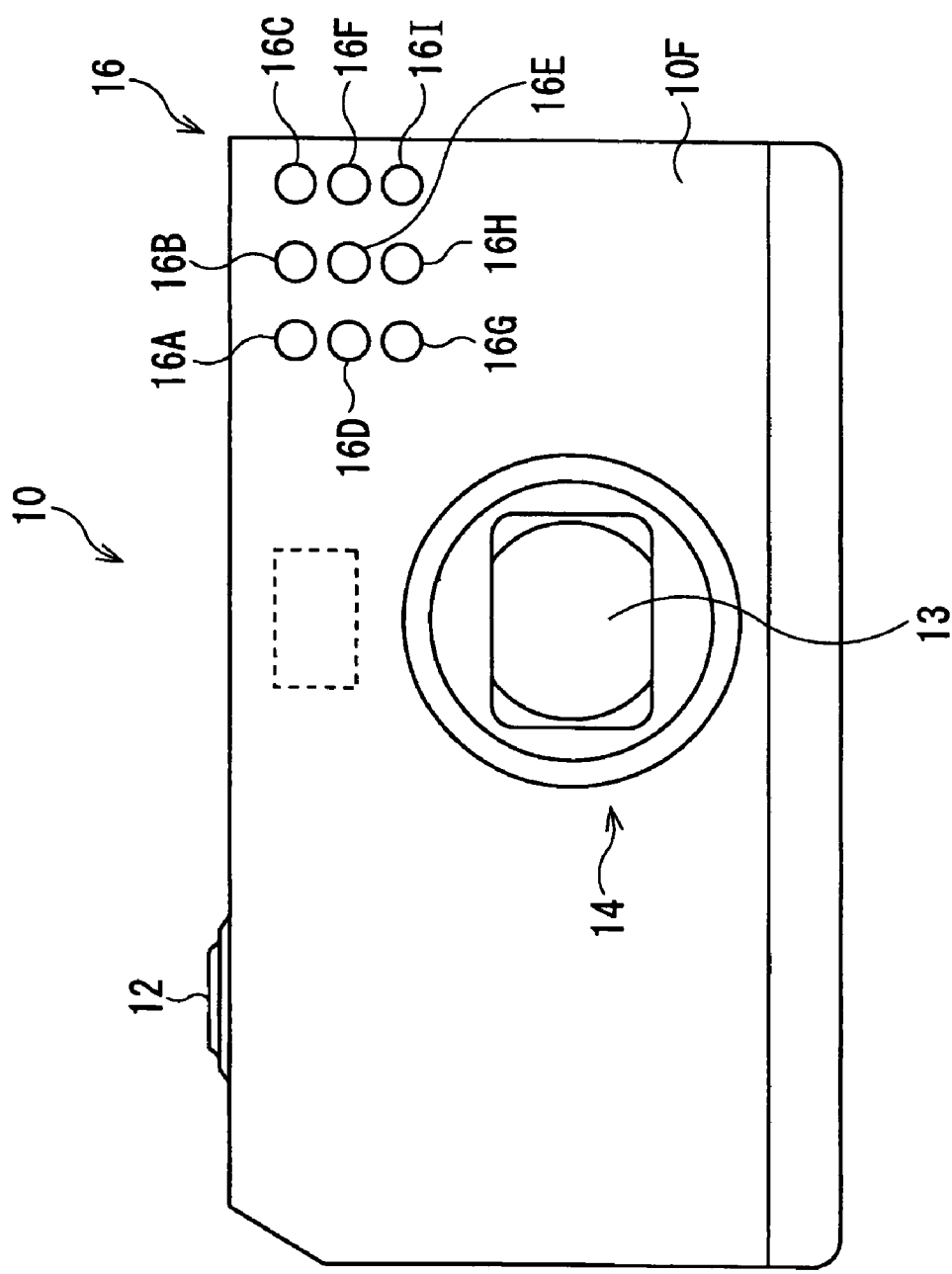
FIG. 1 is a front view of a digital camera of the first embodiment of the present invention.

FIG. 1 is a front view of a digital camera of the first embodiment of the present invention.

A digital camera 10 has a release button 12, a lens barrel 14 including a photographing lens 13, and a lighting apparatus 16. The lighting apparatus 16 includes first to ninth lighting units 16A-16I, having an LED respectively as a light source. The first to ninth lighting units 16A-16I are buried in the front surface 10F of the digital camera 10 in a matrix manner of 3 rows and 3 columns. A fifth lighting unit 16E located in the center of all the lighting units 16A-16I, emits light in a parallel direction to the optical axis of the lens barrel 14 at predetermined illuminating angles. Other lighting units also emit light that defuses, and then the entire photographing area of the digital camera 10 is illuminated. For example, a first lighting unit 16A, emits light towards the upper right direction from a user. Here, the ratio of width in the horizontal direction to length in the vertical direction of the lighting units 16A-16I is 4:3, the same as the aspect ratio of the photographing area of the digital camera 10 to easily illuminate the entire photographing area.

Figure 2:
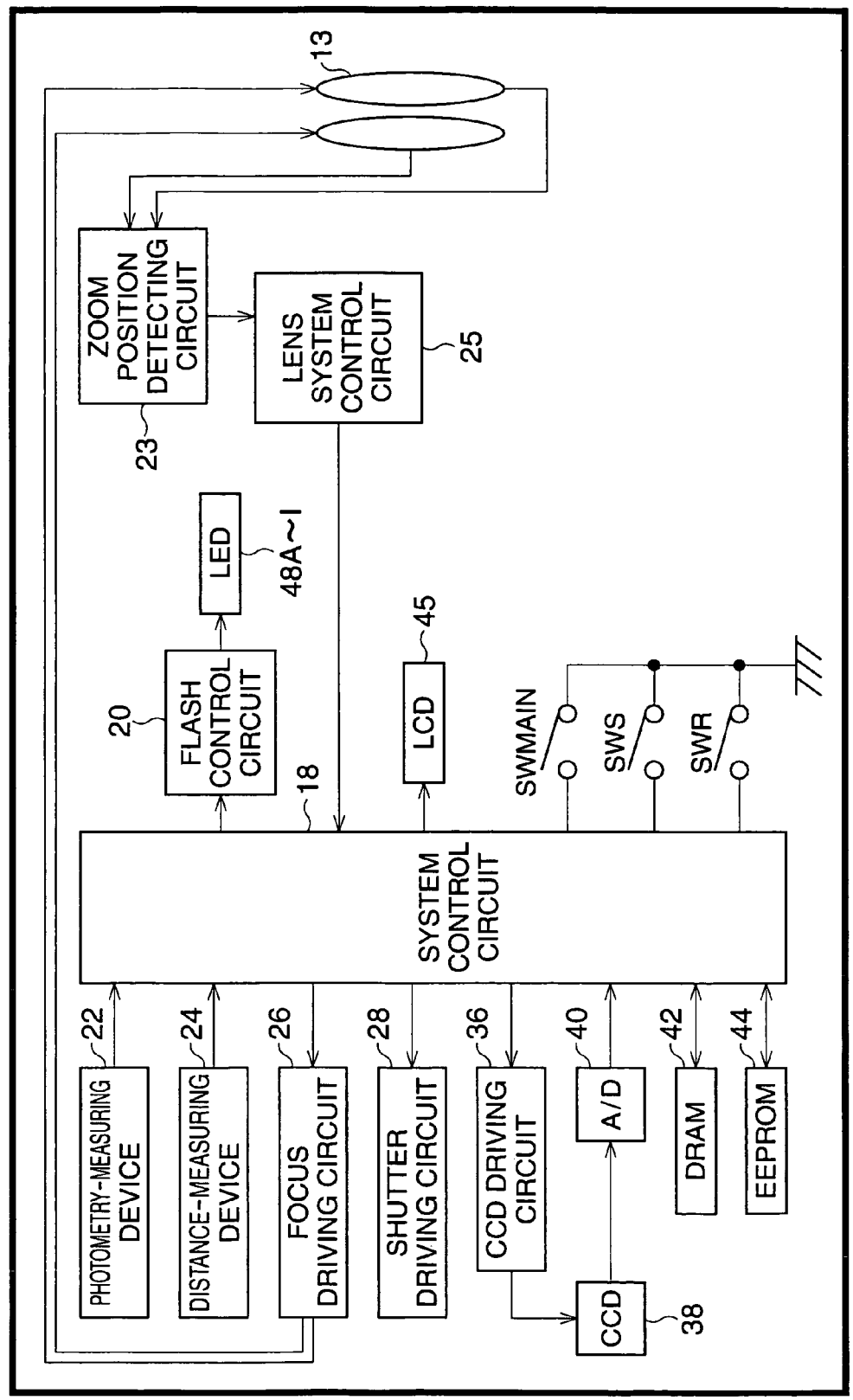
FIG. 2 is a block diagram of the digital camera.

FIG. 2 is a block diagram of the digital camera 10.

A system control circuit 18 controls the whole digital camera 10. A main switch SWMAIN is connected to the system control circuit 18. The main switch SWMAIN is for starting the digital camera, then, when the main switch SWMAIN is turned on by a user, the system control circuit 18 starts. In an EEPROM 44, peripheral light amount data of the photographing lens 13 is previously memorized with various data for processing signals by the system control circuit 18.

As indicated by the cosine fourth law, illuminance of part of an image plane formed by the light entering at the periphery of the photographing lens 13, is less than the illuminance at the center of the image plane formed by light entering at the optical axis of the photographing lens 13. The peripheral light amount data defines ratios of light emission intensities for the lighting units 16A-16I to make the illuminance of an image plane formed by reflected light entering the photographing lens 13, constant between the center and the corner of the image plane. That is, suppose a standard object has a flat surface, extends in a perpendicular direction to the optical axis of the photographing lens 13, and has a constant reflecting light ratio. When a CCD 38 is illuminated by reflected light from the surface of the standard object that has entered the photographing lens 13, and the illuminance is constant regardless of the incident angle, the relative ratios of the light emission intensities of the lighting units 16A-16I are the peripheral light amount data. Further, note that the incident angle of the reflected light on entering the photographing lens 13, is the same as its illuminating angle.

The peripheral light amount data is calculated by an external computer, and memorized in the EEPROM 44. Although the peripheral light amount data is unique for each lens, it is different according to the focal length (lens position) of the same lens. Therefore, in this embodiment, a plurality of sets (for example five sets) of the peripheral light amount data for the photographing lens 13 according to the different focal lengths, are memorized. Hereinafter, the lens position corresponding to each focal length, is called a zoom position.

A photometry-measuring switch SWS connected to the system control circuit 18 turns on when the release button 12 is half depressed. When the photographing mode is set and the photometry-measuring switch SWS turns on, photometry data of a subject to be photographed is measured by a photometry-measuring device 22, and an object distance is measured by a distance-measuring device 24, respectively. The obtained photometry and distance data are transmitted to the system control circuit 18.

According to the distance data measured by the distance-measuring device 24, auto-focusing is carried out by a focus driving circuit 26. In addition to this, a zoom position is detected by a zoom position detecting circuit 23, and then the signal indicating the zoom position is transmitted to the system control circuit 18 via a lens system control circuit 25. A flash control circuit 20 controls the lighting apparatus 16 to illuminate the object when a shutter (not shown) is opened, as mentioned below, based on the control signal from the system control circuit 18. First, predetermined peripheral light amount data memorized in the EEPROM 44, is read by the system control circuit 18. Based on the peripheral light amount data, control signals for controlling the light emitted by the first to ninth LEDs 48A-48I included in each corresponding first to ninth lighting units 16A-16I, is output from the system control circuit 18 to the flash control circuit 20. Pulse signals having a desired duty ratio, predetermined pulse width, and frequency are generated based on the control signal by the flash control circuit 20. The flash control circuit 20 modifies the pulse signals to have suitable values of voltage and current for driving the first to ninth LEDs 48A-48I, and outputs them as driving signals. The first to ninth LEDs 48A-48I driven by the driving signals, emit light having a predetermined intensity respectively.

A release switch SWR is turned on when the release button 12 is fully pressed. When the release switch SWR is turned on, a shutter is opened to adjust exposure by a predetermined aperture for a predetermined time, by the shutter driving circuit 28, based on the control signal from system control circuit 18. And then the CCD 38 controlled by a CCD driving circuit 36 is exposed, so that image signals according to the image are produced in the CCD 38. The image signals are successively read from the CCD 38, and transmitted to an amplifier circuit (not shown).

After the image signals read from the CCD 38 are amplified by the amplifier circuit, the analog image signals are transformed to the digital image signals in an A/D transforming circuit 40. The digital image signals are processed, for example being gamma corrections, and white balance adjustments are carried out, and then the processed signals are transmitted to the system control circuit 18. Further, signals are sent to an LCD driver (not shown) from the system control circuit 18, an LCD 45 is driven, and the subject image is displayed on the LCD 45. The image data of the photographed subjects are memorized in the DRAM 42 or a memory card (not shown).

Figure 3:
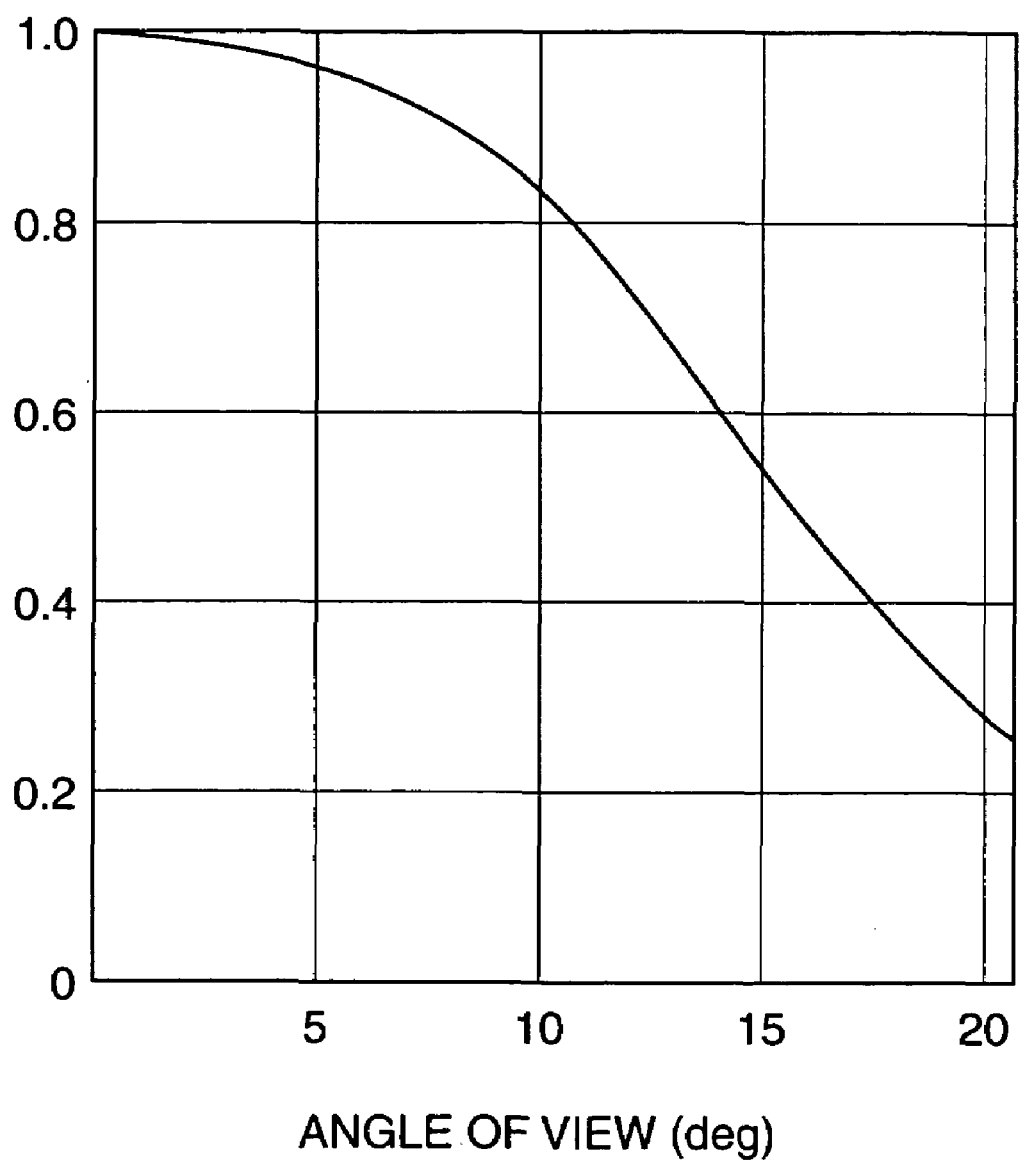
FIG. 3 is a graph representing an example of peripheral illuminance fall-off.

FIG. 3 is a graph representing an example of peripheral illuminance fall-off when photographing the surface of the standard object, on a light-receiving surface of the CCD 38 according to the angle of view of the photographing lens 13.

FIG. 3 indicates the relative intensity of light reflected by the surface of the standard object and entering at different angles of view of the photographing lens 13, with respect to the light entering at 0 degrees of the angle of view of the photographing lens 13, that is light entering the center of the photographing lens 13 along its optical axis. For example, the relative intensity of light entering at a point away from the center of the photographing lens 13, at a 20-degree angle of view of the photographing lens 13, is 0.3 against 1.0 for the light at 0 degrees.

Based on the photographing angle of view and the peripheral light amount data of the photographing lens 13, the intensity of light emitted from each of the first to ninth lighting units 16A-16I is set so that the illuminance on the light accepting surface of the CCD 38 is constant, when the first to ninth lighting units 16A-16I illuminate the surface of the standard object. For example, in terms of the first lighting unit 16A located at the end of the lighting apparatus 16 and at a 20-degree angle of view, and the fifth lighting unit 16E located at the center of the lighting apparatus 16, light intensity emitted by the first lighting unit 16A, is set higher than that of the fifth lighting unit 16E, so that the intensity of reflected light of the light LA and LE are the same after entering the photographing lens13.

In this embodiment, the relative intensity of the light LA emitted by the first lighting units 16A at a 20-degree angle of view of the photographing lens 13 is set as the reciprocal of the relative intensity of light entering at three quarters of the actual angle of view, that is 15 degrees here, for the photographing lens 13. That is, in the example in FIG. 3, the relative intensity of light entering at a 15-degree angle of view of the photographing lens 13, is around 0.55, therefore, the light LA is emitted with its relative intensity being (1/0.55) times the light LE. This is because the peripheral illuminance of reflected light is lower at larger angles of view, (i.e. further from the optical axis of the photographing lens 13), the illuminance of emitting light at larger illuminating angles, should be higher to make up for the peripheral fall-off of the illuminance of reflected light. Note that if the emitting light intensity is set based on the slightly narrower angle of view than that of the actual angle, as in this embodiment, it is possible to avoid loss of light LA from the edge of the lighting apparatus 16, caused by diffusion towards an area outside of the photographing area of the digital camera 10. Therefore, the lighting apparatus 16 illuminates the object efficiently.

The peripheral light amount data memorized in the EEPROM 44, defines the ratios of light emission intensities from the first to fourth lighting units 16A-16D, and the sixth to ninth lighting units 16F-16I, in terms of the intensity of emitted light by the fifth lighting unit 16E. Note that all of the lighting units 16A-16I emit light in each predetermined direction, and then, each of the incident angles of the light reflected into the photographing lens 13 is constant. Therefore, data for relative intensity ratio of light for any incident angle is not necessary, and data for only some predetermined incident angles is required as the peripheral light amount data.

In this embodiment, there are nine lighting units totally, and they are arranged so that the fifth lighting unit 16E is located at the center of the lighting apparatus 16, and others form four pairs being symmetry about the fifth lighting unit 16E. Therefore, the peripheral light amount data for the center of the optical axis and at three quarters of the angle of view of the current focal length for each of the five focal lengths, are memorized in the EEPROM 44. Note that number of peripheral light amount data for one focal length can be changed according to the number and arrangements of the lighting units used for illumination.

As mentioned above, different peripheral light amount data is used according to zoom positions of zoom lenses, therefore, peripheral light amount data for the zoom positions of the photographing lens 13 are memorized in the EEPROM 44. Here, although the photographing angle of view is different according to the zoom positions, emitting light intensity of each lighting unit is determined based on the peripheral light amount data.

The system control circuit 18 reads three peripheral light amount data for eight of the lighting units, that is lighting units other than the fifth lighting unit 16E located at the center of the lighting apparatus 16. This is because the eight lighting units, other than the fifth lighting unit 16E, have one of three kinds of angle of view for the current focal length. And then, the system control circuit 18 determines the emitting light intensities of each of the first to ninth LEDs 48A-48I, by multiplying the reciprocal of the peripheral light amount data by the emitting light intensity of the fifth LED 48E already determined, and outputs control signals according to the emitting light intensities to the flash control circuit 20. The flash control circuit 20 controls light emitting by setting the amount of current provided to each of the first to ninth lighting units 16A-16I based on the control signals.

Figure 4:
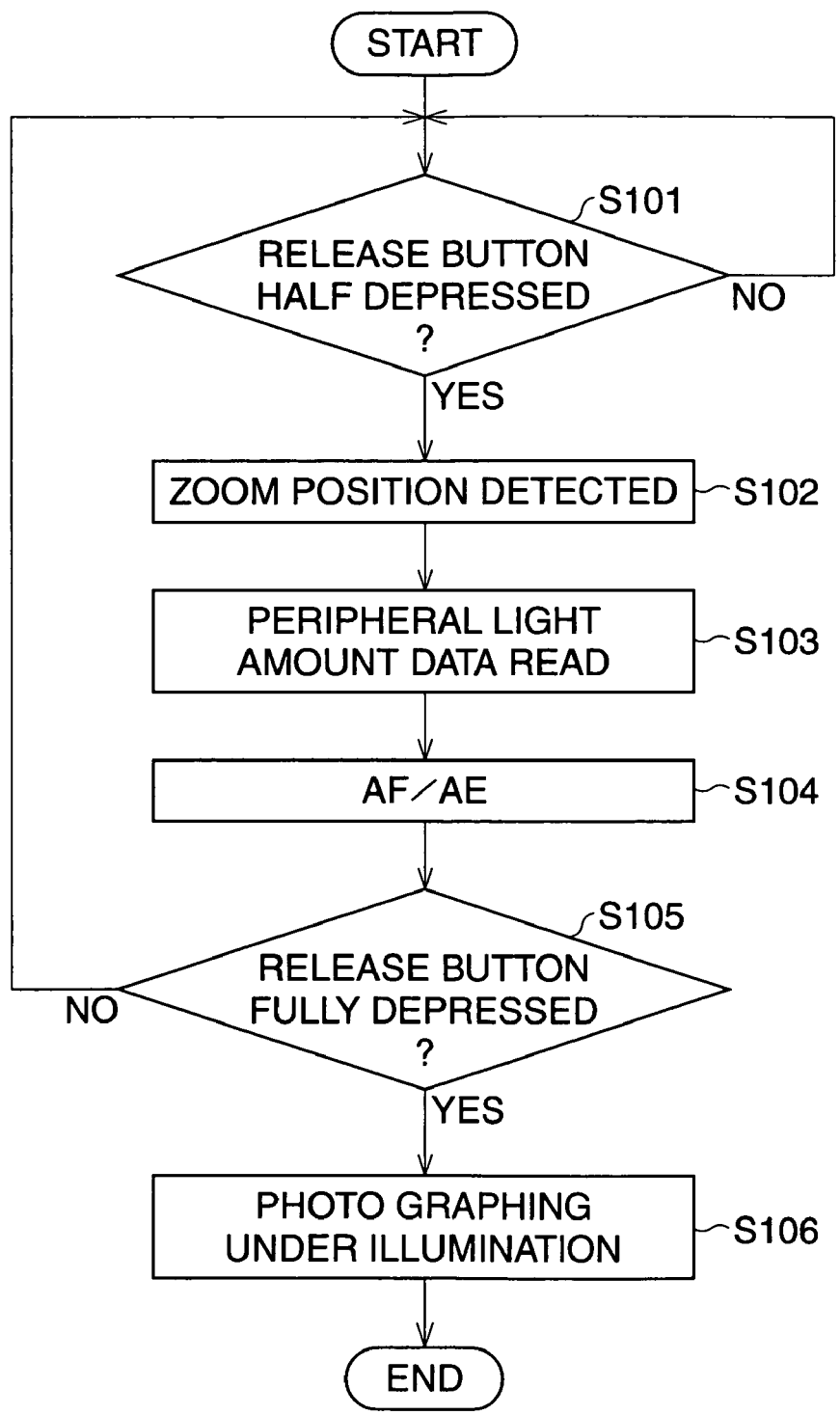
FIG. 4 is a flowchart representing the light amount control process of the lighting apparatus.

FIG. 4 is a flowchart representing the light-amount control process of the lighting apparatus 16.

At step S101, it is judged if the release button 12 is half depressed or not. The step S101 is repeated until it is judged that the release button 12 is half depressed. At step S102, a zoom position of the photographing lens is detected by the zoom position detecting circuit 23, and the control proceeds to step S103. At step S103, the peripheral light amount data according to the zoom position detected at step S102, memorized in the EEPROM 44, and that are ratios of light emission intensities for the lighting units 16A-16I to photograph as the photographing area has constant luminance, is read by the system control circuit 18.

At step S104, according to the distance data measured by the distance-measuring device 24, auto-focusing (AF) is carried out. Further, based on the photometry data of the object measured by the photometry-measuring device 22, auto-exposure (AE) is carried out and the emitting light intensity of the whole lighting apparatus 16 is determined. And then, based on the ratios of the light emission intensities for the lighting units 16A-16I included in the peripheral light amount data read at step S102, and the emitting light intensity of the whole lighting apparatus 16, each emitting light intensity of the first to ninth lighting units 16A-16I is determined. Then the control proceeds to step S105.

At step S105, it is judged if the release button 12 is fully depressed or not. The step S105 is repeated until it is judged that the release button 12 is fully depressed, and when judged fully depressed, the control proceeds to step S106.

At step S106, light is emitted by the first to ninth lighting units 16A-16I respectively, according to a determined intensity, and the object is photographed. At this time, the emitting light intensity is controlled so that the illuminance of the image plane formed by light reflected by the surface of the standard object and having entered the photographing lens 13, is constant, therefore, entire the photographing area is illuminated uniformly.

In the embodiment mentioned above, photographing without corner fall-off of illuminance is carried out by controlling the light emission of each of the first to ninth lighting units 16A-16I, based on the peripheral light amount data memorized in the EEPROM 44.

Figure 5:
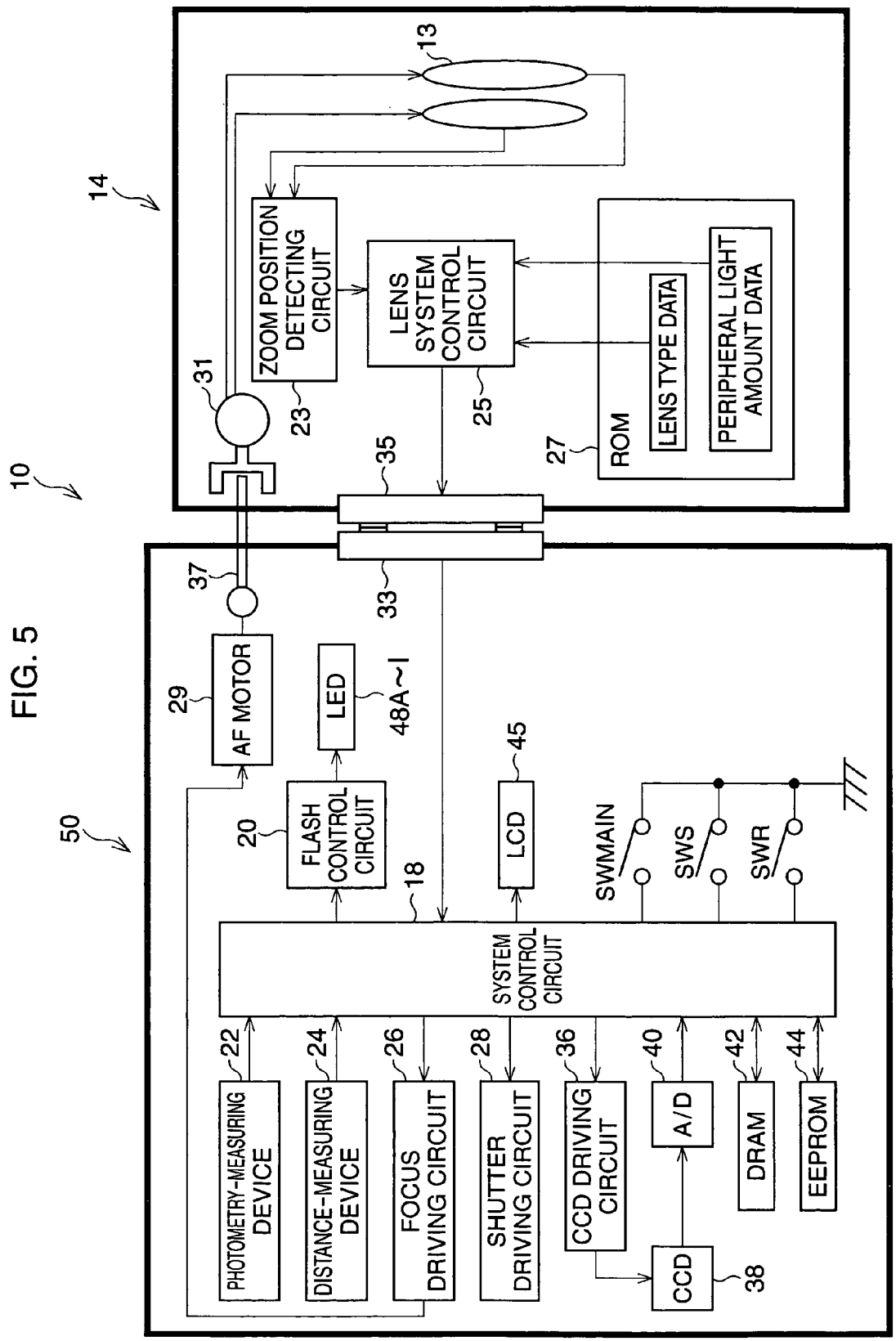
FIG. 5 is a block diagram of a digital camera of the second embodiment.

FIG. 5 is a block diagram of a digital camera 10 of the second embodiment. Hereinafter, the difference to the first embodiment is explained. Note that in FIG. 5, the same components as those in the first embodiment, have the same reference numerals.

In a digital camera 10 of the second embodiment, a photographing lens 13 is detachably attached to a digital camera body 50 of the digital camera 10. The lens barrel 14 has a lens side interface 35 for connection to the camera body 50. On the other hand, the camera body 50 has a camera side interface 33, and then, the lens side interface 35 and the camera side interface 33 are connected to each other when the lens barrel 14 and the camera body 50 are connected to each other.

The lens barrel 14 also has a lens side lens driving mechanism 31 for driving the photographing lens 13. The lens side lens driving mechanism 31 and a camera side lens driving mechanism 37 provided in the camera body 50, are engaged with each other when the lens barrel 14 is attached to the camera body 50. These lens driving mechanisms are controlled by an AF motor 29 to drive the photographing lens 13 for adjusting its focus.

The lens barrel 14 includes a ROM 27 in which the data of the photographing lens 13 is memorized. In the ROM 27, lens type data unique to the photographing lens 13, such as data indicating whether the photographing lens is a zoom lens or not, and the peripheral light amount data are memorized. The peripheral light amount data calculated and memorized in the ROM 27 is for three angles of view, these are a maximum angle of view, half the maximum angle of view, and 0 degrees of the angle of view.

When the photographing lens 13 is a zoom lens, peripheral light amount data of three angles of view for each of a plurality of predetermined focal lengths, previously calculated, is memorized in the ROM 27. These peripheral light amount data are transmitted to the system control circuit 18 from the ROM 27 via a lens system control circuit 25, the lens side interface 35, and the camera side interface 33, when the lens barrel 14 and the camera body 50 are connected. Based on these peripheral light amount data, the first to ninth LEDs 48A-48I included in each corresponding first to ninth lighting units 16A-16I, emit light to make the luminance of the photographing area is constant when illuminating, under the control of the flash control circuit 20 based on the signals from the system control circuit 18. Therefore, no peripheral light amount data of the photographing lens 13 is memorized in the EEPROM 44 of the camera body 50.

The system control circuit 18 interpolates the peripheral light amount data obtained from the lens barrel 14, based on an approximating calculation, and creates new peripheral light amount data. And then, the system control circuit 18 determines the light emission intensities of the first to ninth lighting units 16A-16I, based on the peripheral light amount data, the number and arrangement of the first to ninth lighting units 16A-16I. In the second embodiment, since the number and arrangement of the first to ninth lighting units 16A-16I are the same as in the first embodiment, the system control circuit 18 calculates the peripheral light amount data at three quarters of the angle of view of the current focal length, and makes the first to fourth and the sixth to ninth lighting units 16A-16D and 16F-16I emit light so that each light has an intensity calculated by multiplying the reciprocal of the peripheral light amount data by the intensity of the fifth lighting unit 16E. However, it is possible to create more peripheral light amount data according to the number of lighting units, for setting the light emission intensity of each of the first to ninth lighting units 16A-16I more finely. Further, the peripheral light amount data at the angle of view of the current focal length, not at three quarters of the angle of view, can be calculated and used.

Figure 6:
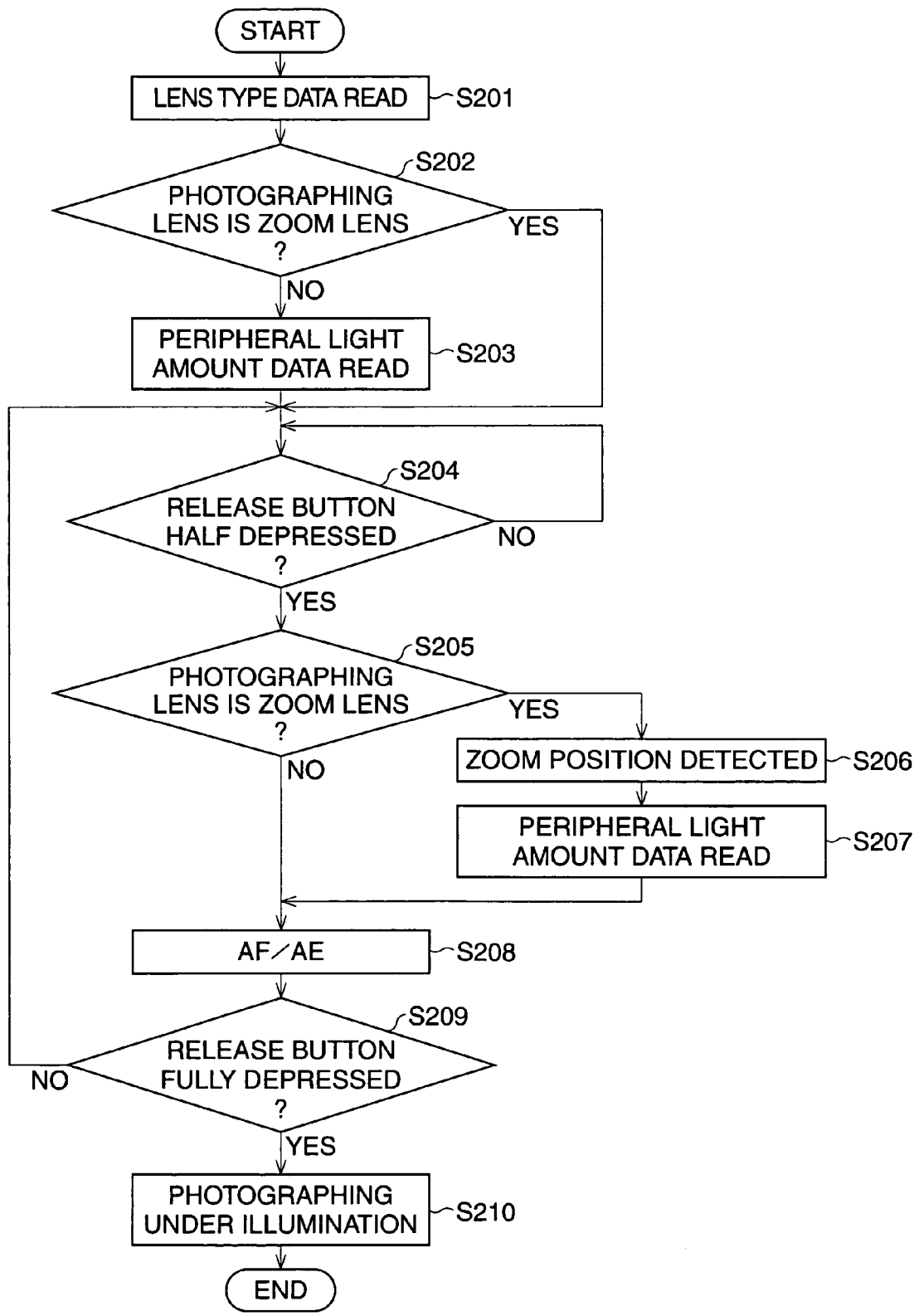
FIG. 6 is a flowchart representing the light amount control process of the lighting apparatus of the second embodiment.

FIG. 6 is a flow chart representing the light amount control process of the lighting apparatus 16 in the second embodiment.

At step S201, lens type data unique to the photographing lens 13 and memorized in the ROM 27, is read by the system control circuit 18, and the control proceeds to step S202. At step S202, it is judged whether the photographing lens 13 is a zoom lens having different peripheral light amount data for different zoom positions, or a single focus lens having peripheral light amount data for only one focal length. When it is judged that the photographing lens 13 is not a zoom lens, the control proceeds to step S203, and when it is judged that the photographing lens 13 is a zoom lens, the control proceeds to step S204.

At step S203, the peripheral light amount data, that is the relative ratios of the light emission intensities for the first to ninth lighting units 16A-16I to make the luminance of the photographing area constant, is read by the system control circuit 18, and the control proceeds to step S204. Note that the reason the peripheral light amount data is not read at step S203 when the photographing lens 13 is a zoom lens, is that the used peripheral light amount data is different depending on the zoom position of the photographing lens 13.

At step S204, it is judged whether the release button 12 is half depressed or not. When it is judged that the release button 12 is half depressed, the control proceeds to step S205, and step S204 is repeated until it is judged that the release button 12 is half depressed.

At step S205, it is judged that whether the photographing lens 13 is a zoom lens or a single focus lens again. When it is judged that photographing lens 13 is a zoom lens, the control proceeds to step S206, and when it is judged that photographing lens 13 is not a zoom lens, the control proceeds to step S208.

At step S206, the zoom position of the photographing lens 13 is detected by the zoom position detecting circuit 23. At step S207, the peripheral light amount data according to the zoom position detected at step S206, is read by the system control circuit 18, and the control proceeds to step S208.

At step S208, auto-focusing (AF) is carried out according to the distance data measured by the distance-measuring device 24. Further, based on the photometry data of the object measured by the photometry-measuring device 22, auto-exposure (AE) is carried out. As a result of the AF and AE, the total light intensity of the whole lighting apparatus 16 is determined. Further, based on the ratios of light emission intensities for the first to ninth lighting units 16A-16I, the emitting light intensities of each the first to ninth lighting units 16A-16I are determined. Then the control proceeds to step S209.

In this second embodiment, the system control circuit 18 reads three peripheral light amount data of the current focal length, calculates light emission intensities for each of the first to ninth LEDs 48A-48I based on the peripheral light amount data, and outputs control signals according to the light intensities to the flash control circuit 20. The flash control circuit 20 controls the light emission by setting the amount of current provided to each the first to ninth lighting units 16A-16I based on the control signals.

At step S209, it is judged whether the release button 12 is fully depressed or not. When it is judged that the release button 12 is fully depressed, the control proceeds to step S210, and when it is judged that the release button 12 is not fully depressed, the control returns to step S204, and following steps are repeated.

At step S210, the lighting apparatus 16 including the first to ninth lighting units 16A-16I whose light emission intensities are determined, strobe-flashes and illuminates the photographic objects. Here, in the second embodiment, the same as the first embodiment, the light emission intensities are controlled to make the image plane illuminance due to light reflected by the surface of the standard object and entering the photographing lens 13 constant, therefore, the luminance of objects to be photographed is constant over the entire photographing area.

As mentioned above, in a digital camera 10 using various photographing lenses, photographing where the luminance is constant over the entire photographing area, is made possible by memorizing the lens type data that is unique to a photographing lens and peripheral light amount data of the photographing lens in the ROM 27 of the lens barrel 14, reading these data with the system control circuit 18, and controlling the light emission of each of the first to ninth lighting units 16A-16I.

The arrangement of the lighting units 16A-16I in the lighting apparatus 16 is not limited to that in the embodiments. For example, two lighting units arranged horizontally along the front surface 10F of the digital camera 10, six lighting units arranged in a matrix manner of 2 rows in the horizontal direction and 3 columns in the vertical direction along the front surface 10F, and twelve lighting units arranged in a matrix manner of 3 rows and 4 columns, can be used. In these cases, each the lighting units 16A-16I emits light in a predetermined direction and at a predetermined illuminating angle to illuminate the entire photographing area.

The lighting apparatus 16 can be used not only with a digital camera 10, but also silver-halide cameras, cellular phones with photographing functions, and so on. And the lighting apparatus 16 can be detachably attached to the camera body and can be controlled by received control signals from the system control circuit 18, differing from forming one body as shown in these embodiments.

Although each of the first to ninth lighting units 16A-16I has the first to ninth LED 48A-48I as a light source, electric lamps and so on, in which the light emission intensity is adjustable, can be used as light sources.

Finally, it will be understood by those skilled in the art that the foregoing description is of preferred embodiments of the apparatus, and that various changes and modifications may be made to the present invention without departing from scope thereof.

The present disclosure relates to subject matter contained in Japanese Patent Application No. 2003-382299 (filed on Nov. 12, 2003) which is expressly incorporated herein, by reference, in its entirety.

The invention claimed is:

1. A light-amount control device, comprising:
    a plurality of lighting units, each of which emits light which illuminates a photographing area of a photographing optical system that comprises a zooming optical system;
    a memory that stores peripheral light amount data, calculated based on a focal length of said photographing optical system and defining ratios of light emission intensities for said lighting units, to make an illuminance of an image plane of an object, having a flat surface perpendicular to an optical axis of said photographing optical system and having a constant reflecting light ratio, constant when said object is illuminated by said lighting units, said image plane being formed by light reflected from said surface of said object and entering said photographing optical system; and
    a lighting unit controller that controls said lighting units so that the intensity of light at a wider illuminating angle to the optical axis of said photographing optical system becomes higher, based on said peripheral light amount data.

2. The light-amount control device according to claim 1, wherein said peripheral light amount data is calculated based on said focal length and an illuminating angle, which are predetermined.

3. The light-amount control device according to claim 1, wherein the memory stores a plurality of sets of the peripheral light amount data, each set corresponding to a different focal length of the photographing optical system.

4. The light-amount control device according to claim 3, further comprising a zoom position detector which detects a zoom position of the photographing optical system, wherein a set of peripheral light amount data is selected from the memory based on the detected zoom position.

5. The light-amount control device according to claim 1, wherein the lighting units are arranged in a matrix, and a ratio of a height of the matrix to a width of the matrix is substantially equal to an aspect ratio of the photographing area.

6. The light-amount control device according to claim 1, further comprising a peripheral light amount data calculator that calculates the peripheral light amount data.

* * * * *